US012639948B2

(12) United States Patent
Luo et al.

(10) Patent No.: US 12,639,948 B2
(45) Date of Patent: May 26, 2026

(54) METHOD AND SYSTEM FOR VIDEO TEMPORAL ACTION PROPOSAL GENERATION

(71) Applicants: Versitech Limited, Hong Kong (HK); TCL Technology Group Corporation, Huizhou (CN)

(72) Inventors: Ping Luo, Hong Kong (HK); Jiannan Wu, Beijing (CN); Jiajun Shen, Hong Kong (HK); Lan Ma, Hong Kong (HK)

(73) Assignees: University of Hong Kong Versitech Limited, Hong Kong (HK); TCL Technology Group Corporation, Huizhou (CN)

( * ) Notice: Subject to any disclaimer, the term of this patent is extended or adjusted under 35 U.S.C. 154(b) by 269 days.

(21) Appl. No.: 18/688,343

(22) PCT Filed: Aug. 19, 2022

(86) PCT No.: PCT/CN2022/113540
§ 371 (c)(1),
(2) Date: Feb. 29, 2024

(87) PCT Pub. No.: WO2023/035904
PCT Pub. Date: Mar. 16, 2023

(65) Prior Publication Data
US 2025/0069397 A1       Feb. 27, 2025

(30) Foreign Application Priority Data
Sep. 8, 2021    (CN) .......................... 202111049034.6

(51) Int. Cl.
G06V 20/40        (2022.01)
G06V 10/44        (2022.01)
G06V 10/764       (2022.01)

(52) U.S. Cl.
CPC .............. *G06V 20/49* (2022.01); *G06V 10/44* (2022.01); *G06V 10/764* (2022.01)

(58) Field of Classification Search
CPC ...... G06V 20/49; G06V 10/44; G06V 10/764; G06V 20/41; G06V 20/46; G06V 10/77; G06V 10/82; G06V 20/40; G06V 40/20
See application file for complete search history.

(56) References Cited

U.S. PATENT DOCUMENTS

2012/0219213 A1    8/2012   Wang et al.
2022/0058396 A1*   2/2022   Chen ..................... G06N 3/045

FOREIGN PATENT DOCUMENTS

CN        110163129 A      8/2019
CN        110852256 A      2/2020
(Continued)

OTHER PUBLICATIONS

Tianwei Lin et al., "Temporal Convolution Based Action Proposal: Submission to ActivityNet 2017," Computer Vision and Pattern Recognition, 2018, 1707.06750v3, p. 1-4.
(Continued)

*Primary Examiner* — Abhishek Sarma
(74) *Attorney, Agent, or Firm* — IDEA Intellectual Limited; Sam T. Yip

(57) ABSTRACT

A system and method for video temporal action proposal generation are provided. It processes video features extracted from the input video through an encoder to obtain video encoding features with global information, extracts corresponding interest segment features from the video encoding features using pre-trained proposal segments, and provides them to the decoder. The decoder generates segment features based on the interest segment features corresponding to each proposal segment and the pre-trained proposal features. These are then provided to the prediction module, generating temporal action proposal results based (Continued)

on the decoder's segment features. The solution in embodiments of the present invention can effectively capture global context information of the video, obtaining video encoding features with stronger representational capabilities. By introducing the several learnable proposal segments to extract the corresponding position-based feature sequences from the video encoding features, the training convergence speed is enhanced, and computational burden is reduced.

9 Claims, 3 Drawing Sheets

(56) References Cited

FOREIGN PATENT DOCUMENTS

| CN | 111327949 A | 6/2020 |
|---|---|---|
| CN | 111372123 A | 7/2020 |
| CN | 112183588 A | 1/2021 |
| CN | 112906586 A | 6/2021 |

OTHER PUBLICATIONS

Jialin Gao et al., "Accurate Temporal Action Proposal Generation with Relation-Aware Pyramid Network," The Thirty-Fourth AAAI Conference on Artificial Intelligence, 2020, vol. 34 (7), p. 10810-10817.
Tianwei Lin et al., "BMN: Boundary-Matching Network for Temporal Action Proposal Generation," IEEE/CVF International Conference on Computer Vision, 2019, p. 3889-3898.
Chuming Lin et al., "Fast Learning of Temporal Action Proposal via Dense Boundary Generator," The Thirty-Fourth AAAI Conference on Artificial Intelligence, 2020, vol. 34 (7), p. 11499-11506.
Haisheng Su et al., "BSN++: Complementary Boundary Regressor with Scale-Balanced Relation Modeling for Temporal Action Proposal Generation," The Thirty-Fifth AAAI Conference on Artificial Intelligence, 2021, p. 2602-2610.

* cited by examiner

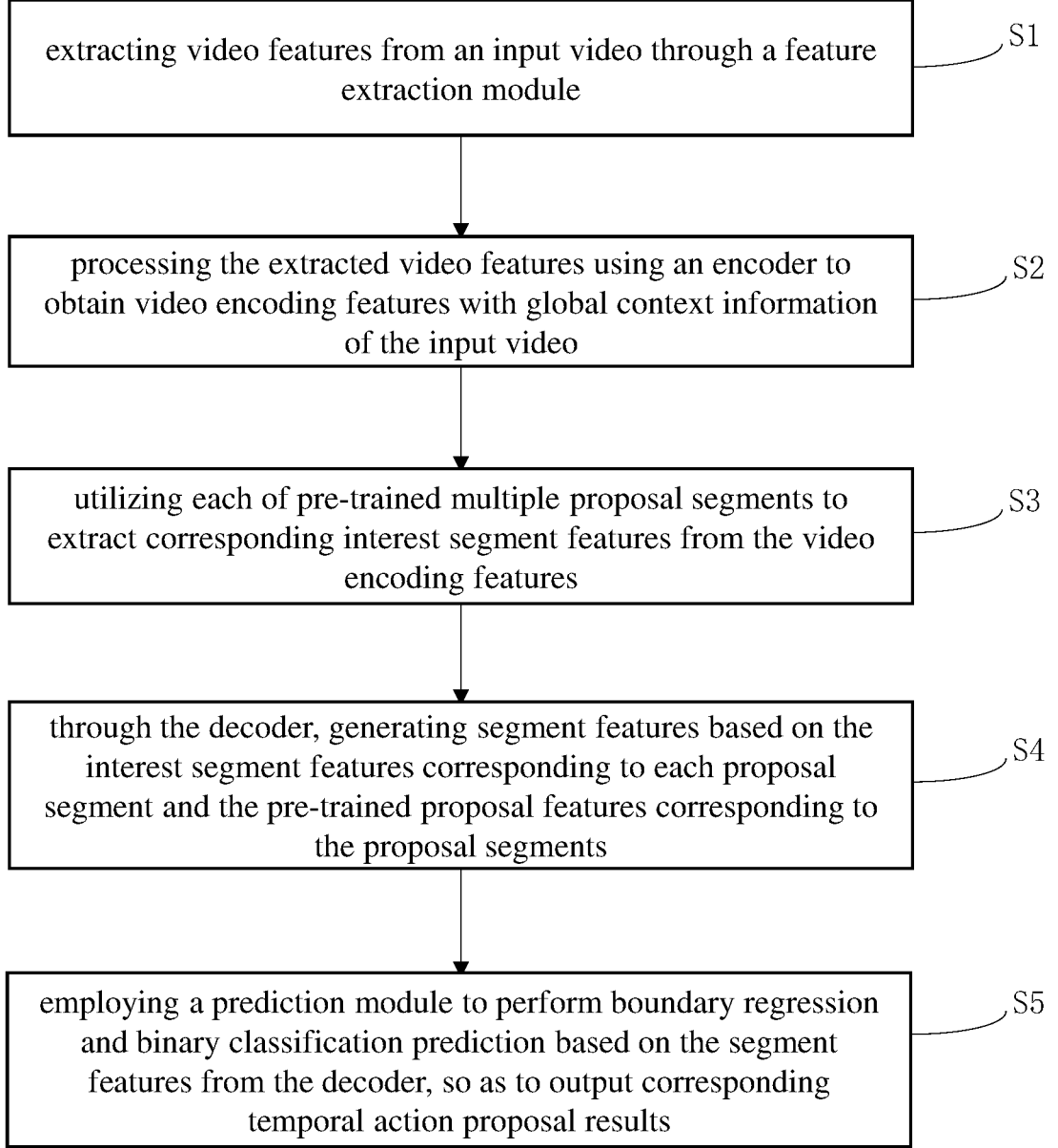

extracting video features from an input video through a feature extraction module    S1 processing the extracted video features using an encoder to obtain video encoding features with global context information of the input video    S2 utilizing each of pre-trained multiple proposal segments to extract corresponding interest segment features from the video encoding features    S3 through the decoder, generating segment features based on the interest segment features corresponding to each proposal segment and the pre-trained proposal features corresponding to the proposal segments    S4 employing a prediction module to perform boundary regression and binary classification prediction based on the segment features from the decoder, so as to output corresponding temporal action proposal results    S5

FIG. 3

METHOD AND SYSTEM FOR VIDEO TEMPORAL ACTION PROPOSAL GENERATION

TECHNICAL FIELD

The present invention relates to video processing, and in particular to systems and methods for video temporal action proposal generation.

BACKGROUND

Generating video temporal action proposals is a key step in video temporal action detection. Its purpose is to detect action segments containing human behavior from an uncropped long video, which means it is to determine the start and end time of the action. High-quality video temporal action proposal should have the following two key characteristics: (1) accurate temporal boundaries, which is the generated action proposal should completely cover the area where the action occurs; (2) reliable confidence scores for accurate evaluation, which is configured to accurately assess the quality of generated proposal for subsequent search ranking. By combining video temporal action proposal with specific action categories, subsequent video temporal action detection tasks can be further completed. Generating video temporal action proposal efficiently and with high quality is beneficial to improving and enhancing the recognition accuracy of video actions.

SUMMARY OF INVENTION

The purpose of embodiments of the present invention is to provide a new method and system for generating video temporal action proposals quickly and efficiently, thereby producing high-quality results for video temporal action proposals. The above-mentioned objectives are achieved through the following technical solutions:

In accordance with a first aspect of the present invention, a system for video temporal action proposal generation is provide, which including a feature extraction module, a feature processing module, and a prediction module. The feature extraction module is used to extract, from an input video, video features related to the input video. The feature processing module includes a pre-trained encoder and decoder. The encoder, based on the video features from the feature extraction module, obtains video encoding features with global information, extracts interest segment features corresponding to each proposal segment from the video encoding features through pre-trained proposal segments, and provides them to the decoder. The decoder, based on the interest segment features corresponding to each proposal segment and pre-trained proposal features corresponding to the proposal segments, generates segment features and provides them to the prediction module. The prediction module generates temporal action proposal results based on the segment features from the decoder, comprising proposal boundaries and confidence scores.

In some embodiments of the present invention, the encoder includes a graph attention layer, a multi-head self-attention layer, and a feed-forward layer. The encoder adds results of the video features and position coding and uses them as a value vector input for the multi-head self-attention layer, and, simultaneously, the encoder provides the results as input to be processed by the graph attention layer. An output thereof undergoes a linear transformation to obtain a query vector and a key vector for the multi-head self-attention layer.

In some embodiments of the present invention, the decoder includes a multi-head self-attention layer, a sparse interaction module, and a feed-forward layer. The decoder processes the proposal features corresponding to the proposal segment through the multi-head self-attention layer and then provides them to the sparse interaction module, for performing sparse interaction with the interest segment features corresponding to the proposal segment. An output of the sparse interaction module is processed through the feed-forward layer to obtain the segment features.

In some embodiments of the present invention, the feature processing module is constructed based on a transformer model.

In some embodiments of the present invention, the prediction module performs boundary regression and binary classification prediction based on the segment features from the decoder.

In accordance with a second aspect of the present invention, a method for generating temporal action proposal generation using the system according to the first aspect of the embodiments of the present invention is further provided, which includes: step S1) extracting video features from an input video through a feature extraction module; step S2) processing the extracted video features using an encoder to obtain video encoding features with global context information of the input video; step S3) utilizing each of pre-trained multiple proposal segments to extract corresponding interest segment features from the video encoding features; step S4) through the decoder, generating segment features based on the interest segment features corresponding to each proposal segment and the pre-trained proposal features corresponding to the proposal segments; step S5) employing a prediction module to perform boundary regression and binary classification prediction based on the segment features from the decoder, so as to output corresponding temporal action proposal results.

In some embodiments of the present invention, the encoder comprises a graph attention layer, a multi-head self-attention layer, and a feed-forward layer. The step S2) includes taking results of adding the video features and position coding as a value vector input for the multi-head self-attention layer, and, simultaneously, taking the results as input to be processed by the graph attention layer, wherein an output thereof undergoes a linear transformation to obtain a query vector and a key vector for the multi-head self-attention layer.

In accordance with a third aspect of the present invention, a computer-readable storage medium is provided, which stores a computer program. The program, when executed, implements the method according to the second aspect of the embodiments.

The technical solutions provided by the embodiments of the present invention can include the following beneficial effects:

The solution can effectively capture the global context information of the video, obtaining video encoding features with stronger representational capabilities; furthermore, by introducing the several learnable proposal segments to extract the corresponding position-based feature sequences from the video encoding features for subsequent predictions, the training convergence speed is greatly enhanced, and computational burden is substantially reduced.

BRIEF DESCRIPTION OF DRAWINGS

The drawings presented here are incorporated into the specification and collectively form part of the specification, illustrating embodiments complying with the present invention and used in combination with the specification to explain the principles of the present invention. It is obvious that the drawings described below are only some embodiments of the present invention; and, for those skilled in the art, additional more drawings can be obtained according to these drawings without creative effort, in which in the drawings:

FIG. 3 shows a schematic flowchart of a method for generating video temporal action proposal according to an embodiment of the present invention.

DETAILED DESCRIPTION OF THE INVENTION

Figure 1:
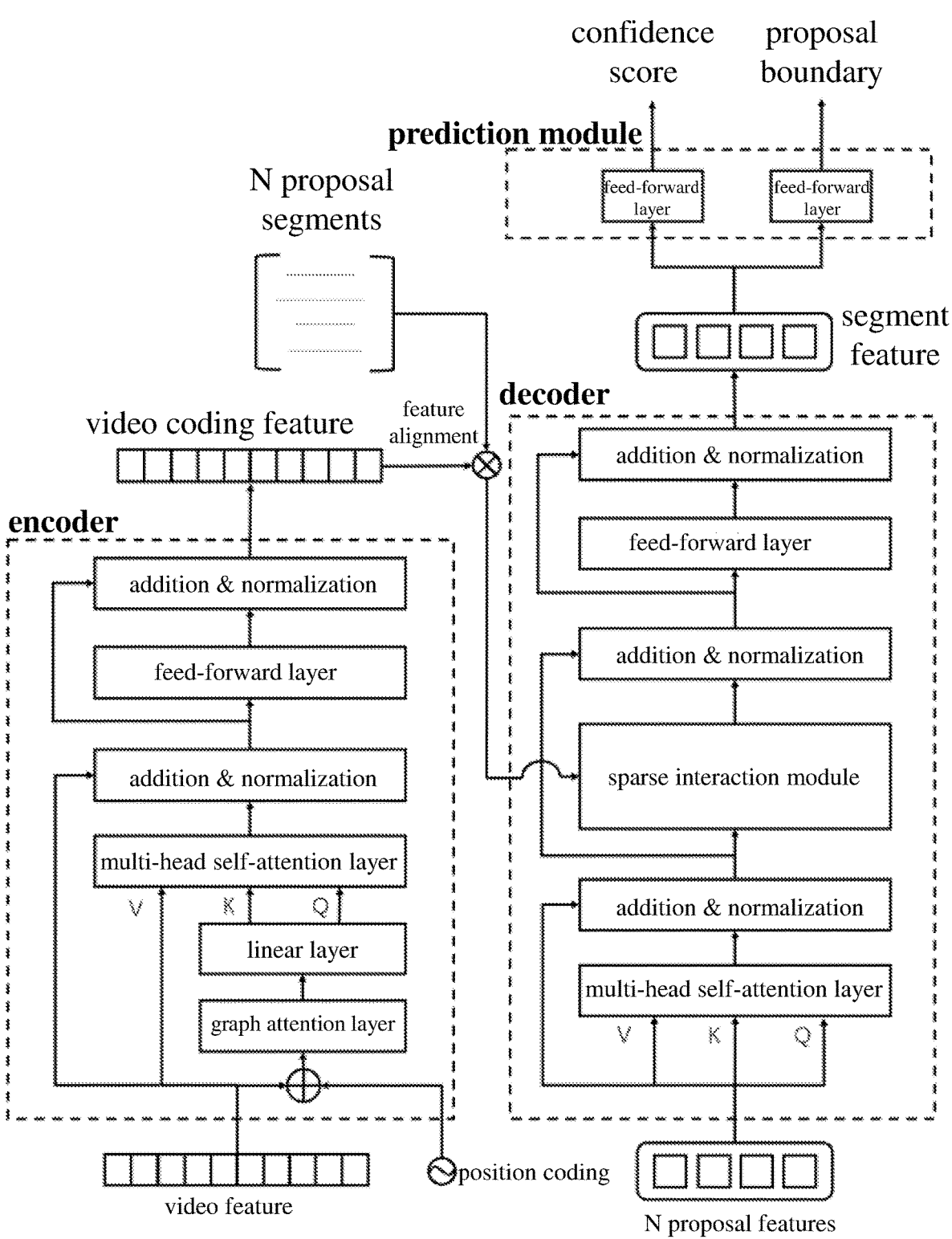
FIG. 1 shows a schematic operational flow diagram of a system for video sequential action proposal generation according to an embodiment of the present invention.

To make the purpose, technical solution, and advantages of the present invention clearer and more understandable, the following detailed description of the present invention is provided in combination with the accompanying drawings through specific embodiments. It should be understood that the described embodiments are parts of the embodiments of the present invention, and not the entirety of all the embodiments. Based on the embodiments in the present invention, all other embodiments obtained by those skilled in the art without creative effort are within the scope of protection of the present invention.

Furthermore, the described features, structures, or characteristics may be combined in any suitable manner in one or more embodiments. In the following description, numerous specific details are provided to give a thorough understanding of embodiments of the present invention. However, those skilled in the art can realize that the technical solutions of the present invention can be practiced without one or more of the specific details, or other methods, components, devices, steps, etc., may be adopted. In some cases, well-known methods, devices, implementations, or operations are not shown or described in detail to avoid obscuring aspects of the present invention.

The block diagrams shown in the drawings are functional entities only and do not necessarily correspond to physically separate entities. That is, these functional entities may be implemented in software form, or implemented in one or more hardware modules or integrated circuits, or implemented in different networks and/or processor devices and/or microcontroller devices.

The flowcharts shown in the drawings are only illustrative, and do not necessarily include all contents and operations/steps, nor must they be performed in the order described. For example, some operations/steps can be decomposed, and some operations/steps can be merged or partially merged, so the actual order of execution may change according to the actual situation.

The existing methods for video temporal action proposal generation can be divided into anchor-based methods and boundary-based methods. The anchor-based methods perform bounding box regression on pre-defined anchors with specified sizes and ratios uniformly distributed, and employ a binary classifier to evaluate the confidence score of the proposals. Specifically, at each position of the one-dimensional feature sequence in the video, anchors with pre-defined sizes and ratios are placed; if the length of the one-dimensional feature sequence is T, and K anchor boxes are laid at each position, then a total of TK anchor box results need to be predicted.

During the training phase, positive and negative samples are selected based on the Intersection over Union (IOU) with the ground truth bounding boxes, and then regression for temporal boundaries and binary prediction for anchor confidence are performed on these TK anchor boxes. In the model inference phase, due to the overlapping of the predicted anchor box results in a large amount, it is necessary to use the non-maximum suppression methods to remove redundant prediction results to obtain the final proposal generation result. The common methods include Prop-SSAD (Lin, T., Zhao, X., & Shou, Z., Temporal convolution-based action proposal: Submission to activitynet 2017. arXiv preprint arXiv:1707.06750.), RapNet (Gao, J., Shi, Z., Wang, G., Li, J., Yuan, Y., Ge, S., & Zhou, X. Accurate temporal action proposal generation with relation-aware pyramid network. In Proceedings of the AAAI Conference on Artificial Intelligence, Vol. 34, No. 07, pp. 10810-10817, April 2020). The performance of such methods heavily relies on the manual design of anchors, making them challenging to generalize and cumbersome when applied to different scenarios. On the other hand, the boundary-based methods enumerate all candidate start and end points to generate candidate proposals of arbitrary lengths, such that probability predictions for the boundaries are obtained to create a two-dimensional confidence map. The basic module of such methods is the convolutional layer, which can only capture information from local regions but cannot capture the long-term semantic information of the video. BMN (Lin, T., Liu, X., Li, X., Ding, E., & Wen, S. Bmn: Boundary-matching network for temporal action proposal generation. In Proceedings of the IEEE/CVF International Conference on Computer Vision, pp. 3889-3898, 2019), DBG (Lin, C., Li, J., Wang, Y., Tai, Y., Luo, D., Cui, Z., . . . & Ji, R. Fast learning of temporal action proposal via dense boundary generator. In Proceedings of the AAAI Conference on Artificial Intelligence, Vol. 34, No. 07, pp. 11499-11506, April 2020), and BSN++ (Su, H., Gan, W., Wu, W., Qiao, Y., & Yan, J. (2020). Bsn++: Complementary boundary regressor with scale-balanced relation modeling for temporal action proposal generation. arXiv preprint arXiv:2009.07641.) belong to this category of such the methods.

Furthermore, both of these methods have two drawbacks. Firstly, as the length of the video increases, the number of the pre-defined anchors and the size of the generated confidence map significantly increase, resulting in a substantial consumption of computational resources and thus making it challenging to apply in practical scenarios. Secondly, both methods generate a large number of redundant proposals, requiring post-processing methods such as non-maximum suppression to eliminate redundant prediction results. Post-processing operations not only require careful parameter selection but will also significantly decrease the inference speed of the model.

In embodiments of the present invention, a system for video temporal action proposal generation is provided, including a feature extraction module, a feature processing module, and a prediction module. The feature extraction module is used to extract video features from the input video which is related to the video. The feature processing module, based on a Transformer model, includes an encoder and a decoder. The encoder obtains video encoded features with global information from the video features extracted by the feature extraction module, and extracts interest segment features corresponding to several pre-set proposal segments from the video encoded features and provides them to the decoder. The decoder, based on the interest segment features corresponding to each proposed segment and the proposal feature corresponding to the same proposal segment, generates segment features and provides them to the prediction module. The prediction module, based on the segment features from the decoder, generates temporal action proposal results, including proposal boundaries and confidence scores.

In this embodiment, the system's feature processing module and prediction module are jointly trained using a training set including a large number of video segments with annotated temporal action proposals, serving as samples (which can be referred to as the offline training phase). Subsequently, the processed video segments are provided as input to the well-trained system for processing, yielding temporal action proposals for the input video, including proposal boundaries and corresponding confidence scores (which can be referred to as the online prediction phase). At an initial system stage, the several pre-set proposal segments along with their corresponding proposal features, as well as parameters involved in the encoder, the decoder, and the prediction module, can be randomly set. During the training process, these parameters are continuously adjusted until the training is completed, and these well-trained parameters are used for subsequent online prediction phases. It should be noted that the feature extraction module and the prediction module herein can adopt any type of machine learning model suitable for video feature extraction and predicting proposal boundaries and confidence scores based on input features, including, but not limited to, neural network models. The present disclosure does not limit these examples. As considering that the process of extracting and processing video features is substantially the same in both the training and online processing stages, the following description primarily introduces the processing of video features during the training stage in combination with FIG. 1.

Firstly, for the input video, video features relevant to the video, such as image features (e.g., RGB features) and optical flow features, are extracted through the feature extraction module. In one example, a neural network such as Temporal Segment Network (TSN) can be employed to extract the video features. For the extracted video features with different dimensions, they are transformed into a series of feature sequences with the same feature dimension. The feature dimension of the feature sequences can be set according to actual requirements, which is not limited herein. For descriptive convenience, in the following examples, the video features are denoted as $f \in \mathcal{R}^{M \times C}$, where R represents real numbers; M represents the length of the video, which can be interpreted as the number of frames in the video; and C represents the dimension of the feature vector, i.e., the dimension of the feature vector extracted from each video frame. It can be observed that the video feature f can also be considered as a video feature sequence composed of feature vectors from M video frames, with each video frame having its specific position in the sequence. The video features extracted by the feature extraction module are provided to the feature processing module for further processing. It should be understood that appropriate transformations can be applied to the aforementioned video features, to adapt or match the feature dimensions set in the feature processing module. For example, the extracted features can undergo one-dimensional convolutional layers with a kernel size of 1 for aligning feature dimensions, and the transformed video feature sequence can then serve as the input to the encoder in the subsequent processes.

Referring to FIG. 1, the encoder primarily includes multi-head self-attention layers and a feed-forward layer. The multi-head self-attention layer is composed of multiple independent self-attention layers. The self-attention layer employs a structure based on attention mechanisms, allowing it to look at other sequence information while encoding the corresponding sequence; this involves connecting sequences pairwise, effectively capturing global contextual information of the input sequence and establishing long-range dependencies between sequences. Therefore, this achieves the goal of enhancing relevant features and suppressing irrelevant features. The input to the multi-head self-attention layer is a triplet composed of query vectors Q (query), key vectors K (key), and value vectors V (value). The calculation process for each self-attention layer is as follows:

$$\text{Attention}(Q, K, V) = \text{softmax}\left(\frac{QK^T}{\sqrt{d_k}}\right)V.$$

Herein, $d_k$ is a scaling factor, where T represents the transpose, and softmax( ) denotes the activation function. As shown in the formula above, the scores between features in the sequence are calculated by taking the dot product of the query vector Q and the key vector K, representing the correlation between these two features. To maintain gradient stability, a scaling factor $d_k$ is used to normalize the scores, followed by applying the softmax( ) function to standardize the values into a range between 0 and 1. The final scores are then used to weight the value vector V, aiming to enhance the relevant features and reduce the suppression of irrelevant features. Based on this foundation, the multi-head self-attention layer includes multiple independent self-attention layers, each focusing on a subset of contextual information. The outputs of these self-attention layers (each output denoted as head, head=Attention(Q, K, V)) are concatenated and are further aggregated through a linear layer, so as to obtain the output of the multi-head self-attention layer with enhanced robustness, denoted as MultiHead(Q, K, V). The calculation formula is as follows:

$$MultiHead(Q, K, V) = Concat(\text{head}_1, ..., \text{head}_h)W_O$$

where h represents the total number of the self-attention layers contained in the multi-head self-attention layer, and $W_O$ is the parameter matrix for the linear layer used to aggregate features. As shown in FIG. 1, the output of the multi-head self-attention layer undergoes further addition and normalization operations before being input to the feed-forward layer. The feed-forward layer consists of two linear transformation layers and a non-linear activation function, Relu. After the processing on the output of the feed-forward layer via the addition and normalization operations, the final output of the entire encoder is obtained, which serve as the video encoded features.

In some embodiments, as being in a typical transformer model, the inputs Q, K, V to the multi-head self-attention layer in the encoder are obtained by mapping the input feature sequence via three linear transformation layers with different parameter matrices ($W_Q$, $W_K$, $W_V$). For example, assuming the input sequence is $T_0$, then Q, K, I can be calculated as follows:

$$Q = T_0 W_Q,$$

$$K = T_0 W_k,$$

$$V = T_0 W_V.$$

In the embodiment illustrated in FIG. 1, a graph attention layer is introduced into the encoder based on the multi-head self-attention layer to pre-process the input sequence, which allows the encoder to better focus on the segments which represent actions occurring in the video and build connections between these action segments, thereby obtaining encoding features with stronger representation capabilities. Also, for the relative position relationship in the video features, such as the relative position and timing relationship of each video frame, position coding cab be used in the encoder, and the input video feature sequence and the addition result of the position coding are used as input $x \in \mathcal{R}^{M \times d}$; where d is the dimension of the features used in the encoder. The dimension of the position coding matches that of the input video features, meaning at lease feature vector of each video frame in the input video feature sequence has a corresponding position coding. As afore-mentioned, position coding, one of the parameters in the encoder, is randomly set during the system initialization and is continuously adjusted during subsequent training processes.

As shown in FIG. 1, the input x obtained by adding the input video feature sequence and the position coding is directly used as the value vector V for the multi-head self-attention layer. Simultaneously, this input x is provided to a graph attention layer for transformation, in which the output of the graph attention layer undergoes further linear layer transformations, so as to obtain the query vector Q and key vector K for the multi-head self-attention layer. The graph attention layer is employed to enhance the connection relationship between different temporal features in the video; taking the example of the input vector x at time point i, it undergoes transformation after passing through the graph attention layer as follows:

$$x_i' = x_i + \Big\|_{k=1}^{K} \sigma\Big(\sum_{j \in N_i} \alpha_{ij}^k W^k x_j\Big),$$

herein, $\|$ denotes the concatenation operation; K represents the number of heads in the graph attention layer; i=1,2, . . . , M, where M, as afore-mentioned, represents the length of the video, which can be interpreted as the number of frames in the video. $W^k$ is the learnable weight matrix for the k-th graph self-attention layer, $\sigma$ is a non-linear activation function, such as the Leaky ReLU function.

$$\alpha_{ij}^k$$

represents the weight coefficient for a relation $x_i$ to $x_j$ of the feature vector in the k-th graph attention layer, indicating the magnitude of correlation therebetween, which involves the calculation process as follows:

$$\alpha_{ij}^k = \frac{\exp\big(\sigma\big(\alpha_k^T\big[W^k x_i \| W^k x_j\big]\big)\big)}{\sum_{l \in N_i} \exp\big(\sigma\big(\alpha_k^T\big[W^k x_i \| W^k x_l\big]\big)\big)},$$

herein, $\alpha_k$ is a learnable weight vector; T represents the transpose operation. By introducing the graph attention mechanism in the encoder, dynamic relationships between different frames of the video feature sequence can be further established, which can more accurately capture the global context information and make the encoder obtain the video encoding features with enhanced representation capabilities.

Continuing with reference to FIG. 1, in embodiments of the present invention, N learnable proposal segments and their corresponding proposal features are introduced to further process the video encoding features output by the encoder. Each proposal segment extracts corresponding position features from the video encoding features to obtain the interest segment features. These features, along with the proposal features corresponding to the proposal segment, are provided as input to the decoder, in which each proposal segment is represented by a normalized two-dimensional coordinate (with values between 0 and 1), indicating a segment on the video timeline; and each proposal feature is a vector of dimension d. Herein, the lengths of the proposal segments can be different than each other, and therefore the dimensions of the extracted feature sequences may also differ. As such, in one embodiment, after using the proposal segments to extract the feature sequence of the corresponding position from the video encoding features, bilinear interpolation can be used to adjust all extracted features to the same length M', where the dimension of each interest segment feature is M'×d. As afroed-mentioned, similar to the position coding in the encoder, these N proposal segments and their corresponding proposal features are also parameters to be obtained during the training process. They are randomly set during system initialization and are continuously adjusted during the subsequent training process.

In the decoder, these N proposal features are first input into the multi-head self-attention layer, so as to obtain relevant information about long-range dependencies between proposal features via into the multi-head self-attention layer. After the output of the multi-head self-attention layer is processed through addition and normalization processing, each proposal feature corresponding to the proposal segment and the interest segment feature corresponding to that proposal segment undergo one-to-one interaction in the sparse interaction module. The output of the sparse interaction module is further processed through addition and normalization and then provided to the feed-forward layer, and N segment features are output, after the output of the feed-forward layer is added and normalized, representing the output result of the decoder.

Figure 2:
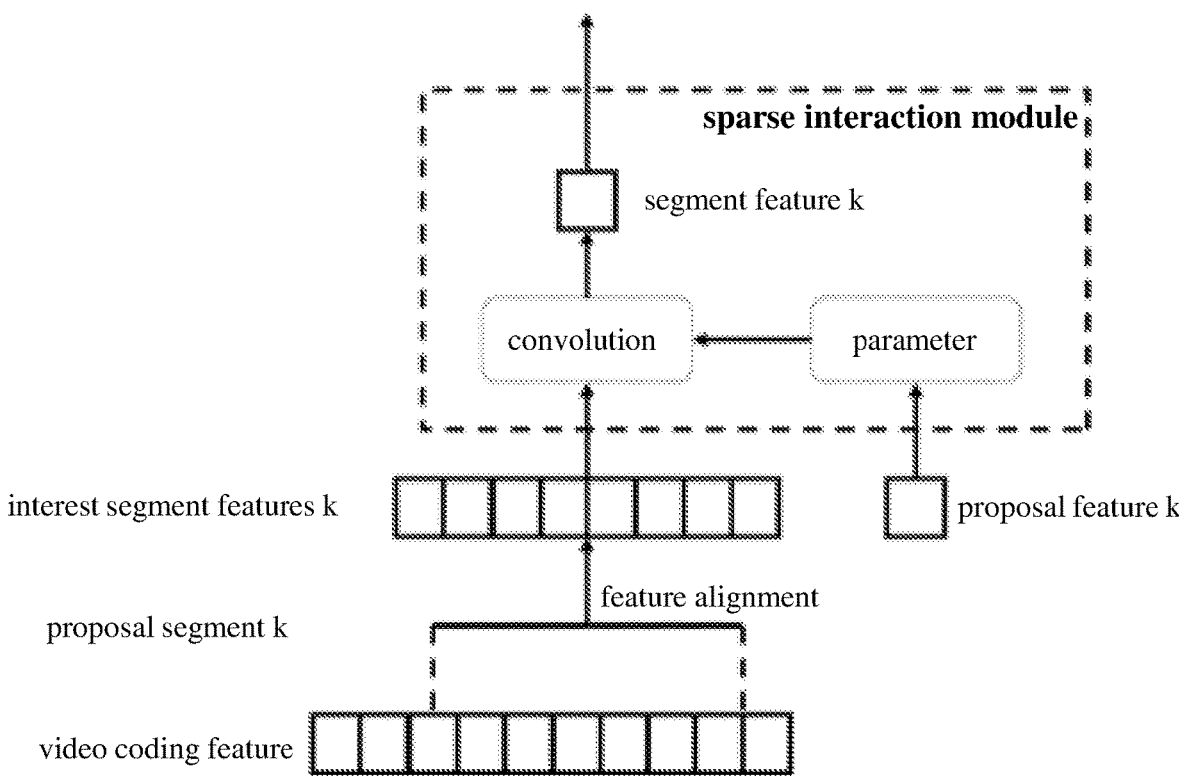
FIG. 2 shows a schematic diagram of a sparse interaction process of a sparse interaction module according to an embodiment of the present invention.

In FIG. 2, using the k-th proposal feature as an example, it illustrates its sparse interaction process with the corresponding interest segment feature in the sparse interaction module. Specifically, the proposal feature vector with dimension d is fed into a linear layer for scaled adjustment, so as to obtain two parameters with sizes $dd \times d_h$ and $d_h \times d$ (where $d_h$ can be set according to specific decoder requirements). The interest segment feature is then subjected to matrix multiplication with these two parameters successively, resulting in a segment feature of size M'×d. This process can be considered as the interested feature segment undergoing a two-layer one-dimensional convolutional operation, and there it also known as dynamic convolution. In the decoder as described above, the proposal features interact with the corresponding interest segment features without the need for interaction with the global video encoding features, significantly improving the training convergence speed.

Continuing with reference to FIG. 1, the prediction module receives N segment features from the decoder for boundary regression and binary classification prediction, which can produce N proposal predictions, including proposal boundaries and corresponding confidence scores. In each training iteration, the N proposal predictions obtained through the above process are matched one-to-one with the true proposal labels of the corresponding samples using optimal bipartite matching. For instance, using a Focal loss function as the binary classification loss function, in which L1 loss function and GIOU loss function are taken as the regression loss functions. For a video, it is to calculate the sum of the classification cost and regression cost of the N proposal prediction results for each proposal label; then, for each real proposal label, the unique proposal prediction result with the smallest total cost is selected as a positive sample, and the proposal prediction results that do not match the real proposal label are regarded as negative samples. In this embodiment, the prediction module consists of two independent feed-forward layers. One feed-forward layer, consisting of a linear layer, is responsible for evaluating the confidence score of the generated proposal results. Another one feed-forward layer, composed of three linear layers, is responsible for regressing the coordinates of the proposals. This training process is repeated on the training set for iteratively optimizing the model. The proposal boundaries output by the prediction module in each training round are used as the N proposals for the next round of training. After training completion, the parameters related to the N proposals and their corresponding proposal features, as well as the parameters in the encoder, the decoder, and the prediction module, are finalized and are ready for subsequent online prediction stages. In the present disclosure, the value of N can be set based on the length of the video segment to be processed, specific requirements, and system performance. For example, on a 1-minute video segment to be precessed, typically having 2 to 3 proposals, N can be set to any integer greater than the potential number of proposals on the video segment; for example, any integer greater than 3. However, it should be understood that larger values of N consume more computational resources. Therefore, Nis generally set to be no more than 10 times the potential number of proposals on the video segment to be processed. For instance, for a 1-minute video segment to be processed, N can be set to an integer between 3 and 30.

In the online prediction stage, the video segment to be processed is provided for the system. The system initially extracts video features from it; then, through the encoder, the extracted video features are transformed into video encoding features that encompass the global context information of the input video, done by combining each of the N pre-trained proposal segments which extracts the corresponding interest segment features from the video encoding features. Subsequently, the decoder engages in one-to-one interaction for each proposal segment's corresponding interest segment features and their associated proposal features to obtain segment features. These segment features are then provided to the prediction module. Finally, the prediction module performs boundary regression and binary classification predictions on the segment features from the decoder, outputting the N proposal generation results corresponding to the video segment to be processed. Unlike existing technologies, this system, by introducing the N learnable proposal segments and their corresponding proposal features, directly generates N action proposal results, without the need for a post-processing step with non-maximum suppression. Moreover, the number of generated action proposals is independent of the video length, leading to a significant reduction in computational burden and to a substantial improvement in the speed of temporal action proposal generation.

It is clear that the system in accordance with the described embodiment effectively captures the global context information of the video, obtaining video encoding features with stronger representational capabilities; furthermore, by introducing the several learnable proposal segments to extract the corresponding position-based feature sequences from the video encoding features for subsequent predictions, the training convergence speed is greatly enhanced, and computational burden is substantially reduced.

FIG. 3 illustrates the schematic diagram of the process for temporal action proposal generation using the system for video temporal action proposal generation according to the above embodiments of the present invention. The method include the following steps: step S1) extracting video features from an input video through a feature extraction module; step S2) processing the extracted video features using an encoder to obtain video encoding features with global context information of the input video; step S3) utilizing each of preset multiple proposal segments to extract corresponding interest segment features from the video encoding features; step S4) employing a decoder to perform an interaction between the proposal features corresponding to each proposal segment and the interest segment features corresponding to that proposal segment, so as to obtain segment features; step S5) employing a prediction module to perform boundary regression and binary classification prediction based on the segment features from the decoder, so as to output corresponding temporal action proposal results.

To better illustrate the performance of the present invention, the inventor compares the method for temporal action proposal generation of the present invention with commonly used methods based on the THUMOS14 dataset and the ActivityNet-1.3 dataset.

During the training process, the system structure shown in FIG. 1 is iteratively trained for 20 cycles on the training set. After each cycle, the loss on the validation set is calculated to evaluate the system's performance, and the system structure with the smallest validation set loss is selected as the completed training system.

In the prediction phase, the video features are input into the well-trained system, and the output results from the prediction module are taken as the final N proposal results. The proposal results are compared with the true proposal labels, and the recall rate on the validation set is calculated to verify the performance of the trained model structure. Table 1 is the comparison for the performance of the present invention's method with current mainstream methods on the THUMOS14 dataset, using proposal recall rate as the evaluation metric, which can show that the method of the present invention outperforms other methods. Table 2 is the comparison for the method of the present invention with other mainstream algorithms on the ActivityNet-1.3 dataset in terms of inference speed. To ensure a fair comparison, the average inference time for each video is calculated, indicating that the method of the present invention is at least 8 times faster than existing methods.

TABLE 1

| METHOD | AR@50 | AR@100 | AR@200 | AR@500 |
|---|---|---|---|---|
| BSN | 37.46 | 46.06 | 53.21 | 60.64 |
| BMN | 39.36 | 47.72 | 54.70 | 62.07 |

TABLE 1-continued

| METHOD | AR@50 | AR@100 | AR@200 | AR@500 |
|---|---|---|---|---|
| RapNet | 40.35 | 48.23 | 54.92 | 61.41 |
| DBG | 37.32 | 46.67 | 54.50 | 62.21 |
| The present invention | 40.40 | 48.70 | 55.51 | 62.20 |

TABLE 2

| METHOD | BSN | BMN | GTAD | DBG | The present invention |
|---|---|---|---|---|---|
| $T_{pro}$ (sec) | 0.671 | 0.118 | 0.103 | 0.219 | 0.056 |
| $T_{all}$ (sec) | 0.815 | 0.745 | 0.862 | 0.596 | 0.074 |

In another embodiment of the present invention, a computer-readable storage medium is provided, storing a computer program or executable instructions. When a processor or other computing unit executes the computer program or executable instructions, it implements the technical solution as described in the aforementioned embodiments. The implementation principle is similar, and it will not be repeated here. In embodiments of the present invention, the computer-readable storage medium can be any tangible medium capable of storing data and readable by a computing device. Examples of computer-readable storage media include hard disk drives, network-attached storage (NAS), read-only memory, random-access memory, CD-ROM, CD-R, CD-RW, tape, and other optical or non-optical data storage devices. The computer-readable storage medium may also include computer-readable media distributed over a network-coupled computer system for distributed storage and execution of computer programs or instructions.

Throughout this specification, references to "various embodiments," "some embodiments," "an embodiment," or "embodiments" are intended to include specific features, structures, or characteristics described in at least one embodiment. Therefore, the phrases "in various embodiments," "in some embodiments," "in one embodiment," or "in embodiments" appearing in various places throughout the specification do not necessarily refer to the same embodiment. Furthermore, specific features, structures, or characteristics may be combined in any suitable manner in one or more embodiments. Thus, the conjunction of an embodiment described or depicted in one place can be combined with features, structures, or characteristics of another embodiment, whether or not explicitly described or depicted.

The terms "comprising" and "having" and similar terms used in this specification are intended to cover non-exclusive inclusion, such that a process, method, system, product, or apparatus that comprises a list of elements is not necessarily limited to those elements, but may include other elements not expressly listed or inherent to such process, method, system, product, or apparatus. The terms "one" or "an" also do not exclude plural instances. Additionally, various elements in the drawings are for illustrative purposes only and may not be drawn to scale.

Although the present invention has been described with reference to specific embodiments, it should be understood that the invention is not limited to these embodiments. Various modifications and variations may be made without departing from the scope of the invention.

The invention claimed is:

1. A system for video temporal action proposal generation comprising a feature extraction module, a feature processing module, and a prediction module, wherein:
   the feature extraction module is used to extract, from an input video, video features related to the input video;
   the feature processing module comprises a pre-trained encoder and decoder, wherein the encoder, based on the video features from the feature extraction module, obtains video encoding features with global information, extracts interest segment features corresponding to each proposal segment from the video encoding features through pre-trained proposal segments, and provides them to the decoder, wherein the decoder, based on the interest segment features corresponding to each proposal segment and pre-trained proposal features corresponding to the proposal segments, generates segment features and provides them to the prediction module;
   the prediction module generates temporal action proposal results based on the segment features from the decoder, comprising proposal boundaries and confidence scores.

2. The system according to claim 1, wherein the encoder comprises a graph attention layer, a multi-head self-attention layer, and a feed-forward layer, the encoder adds results of the video features and position coding and uses them as a value vector input for the multi-head self-attention layer, and, simultaneously, the encoder provides the results as input to be processed by the graph attention layer, wherein an output thereof undergoes a linear transformation to obtain a query vector and a key vector for the multi-head self-attention layer.

3. The system according to claim 1, wherein the decoder includes a multi-head self-attention layer, a sparse interaction module, and a feed-forward layer, and wherein the decoder processes the proposal features corresponding to the proposal segment through the multi-head self-attention layer and then provides them to the sparse interaction module, for performing sparse interaction with the interest segment features corresponding to the proposal segment; wherein an output of the sparse interaction module is processed through the feed-forward layer to obtain the segment features.

4. The system according to claim 1, wherein the feature processing module is constructed based on a transformer model.

5. The system according to claim 1, wherein the prediction module performs boundary regression and binary classification prediction based on the segment features from the decoder.

6. A method for generating temporal action proposal generation using the system according to claim 1, comprising:
   step S1) extracting video features from an input video through a feature extraction module;
   step S2) processing the extracted video features using an encoder to obtain video encoding features with global context information of the input video;
   step S3) utilizing each of pre-trained multiple proposal segments to extract corresponding interest segment features from the video encoding features;
   step S4) through the decoder, generating segment features based on the interest segment features corresponding to each proposal segment and the pre-trained proposal features corresponding to the proposal segments;
   step S5) employing a prediction module to perform boundary regression and binary classification prediction based on the segment features from the decoder, so as to output corresponding temporal action proposal results.

7. The method according to claim 6, wherein the encoder comprises a graph attention layer, a multi-head self-attention layer, and a feed-forward layer, wherein the step S2) comprises taking results of adding the video features and position coding as a value vector input for the multi-head self-attention layer, and, simultaneously, taking the results as input to be processed by the graph attention layer, wherein an output thereof undergoes a linear transformation to obtain a query vector and a key vector for the multi-head self-attention layer.

8. The method according to claim 6, wherein the decoder includes a multi-head self-attention layer, a sparse interaction module, and a feed-forward layer, wherein the step S4) comprises processing the proposal features corresponding to each proposal segment through the multi-head self-attention layer and then feeding them into the sparse interaction module for performing sparse interaction with the interest segment features corresponding to the proposal segment; wherein an output of the sparse interaction module is processed through the feed-forward layer to obtain the segment features.

9. A computer-readable storage medium, characterized in that the computer-readable storage medium stores a computer program, wherein the program, when executed, implements the method according to claim 6.

\* \* \* \* \*